July 4, 1939.  W. A. BERGSTROM  2,164,304
NUT AND METHOD OF MAKING THE SAME
Filed Oct. 14, 1937
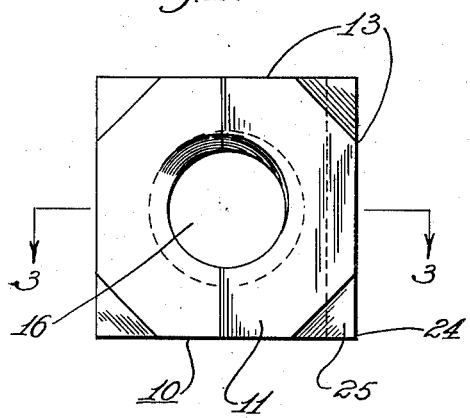
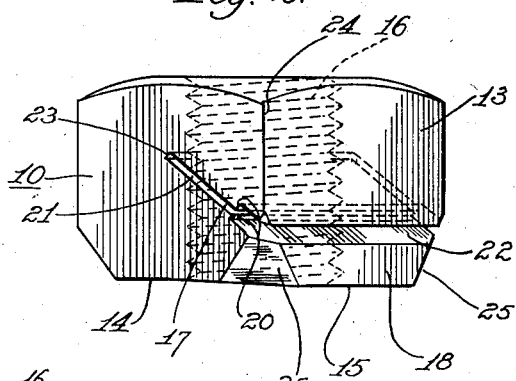
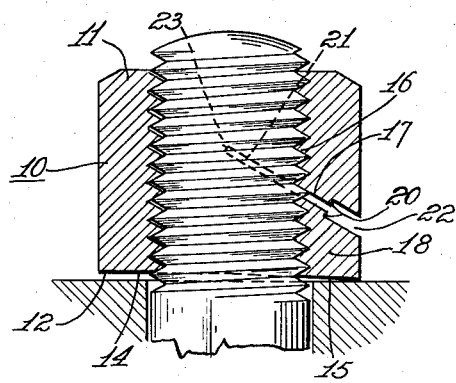
Inventor:
William A. Bergstrom Patented July 4, 1939

2,164,304

UNITED STATES PATENT OFFICE 2,164,304

NUT AND METHOD OF MAKING THE SAME

William A. Bergstrom, Chicago, Ill., assignor to Renchtite Spring Nut Company, San Francisco, Calif., a corporation of California Application October 14, 1937, Serial No. 168,991

19 Claims. (Cl. 10—86)

This invention relates to nuts and the methods of making the same, particularly contemplating a lock nut which, by reason of the contact of its inner face with a work piece, will lockingly engage the coacting bolt and its threads.

Among its other objects this invention has in view a lock nut construction, which, when in its operative or functional position, will firmly lock the nut in such position against unintentional displacement and at the same time permits the nut to be repeatedly used and locked in place without damage to it or the threads of the bolt with which it cooperates.

Furthermore the use of the present nut will not bend or otherwise destroy or distort the alignment of the bolt nor will it mutilate or damage the threads on the bolt.

The method hereof is designed to produce the nut of the present invention in an economical and efficient manner, accommodating and providing for the peculiarities of construction of the nut and imparting to it the characteristics necessary to and essential for its successful operation and production.

With the above and other objects in view, as will be apparent, this invention consists in the construction, combination and arrangement of parts and of the steps of the method, all as hereinafter more fully described, claimed and illustrated in the accompanying drawing, wherein:

Fig. 1 is a plan view of a nut constructed in accordance with and by the method of the present invention:

Fig. 2 is a side elevation thereof: and

Fig. 3 is a sectional view thereof taken along line 3—3 of Fig. 1.

The lock nut forming the subject matter of the present invention comprises a body formed from metal, having the characteristics hereinafter pointed out, which is formed to desired or predetermined standards of shape and size. The inner or lower face of the nut blank has a portion thereof lying parallel to the outer or upper face of the blank, while the remainder of such inner or lower face, usually not less than one-half thereof slopes or inclines outwardly at an angle to the first portion of said face: thereby imparting a greater thickness to the blank on or at one side edge than at its opposite side edge. A slot is formed or provided in the blank extending from the thicker side edge thereof to a point at least to and preferably beyond the axis of the nut. This slot is angularly disposed to the axis of the nut and to the places of the faces thereof, extending downwardly in the direction of the angular portion of the inner or lower face of the nut. Being located within the body of the nut directly in alignment with the angularly disposed portion of the inner or lower face of the nut, the slot creates a spring section of the nut integral with the body thereof on each side of its bore and defined on one side by the said slot and upon its opposite side by the angularly disposed portion of the inner or lower face of the nut. As this spring section projects outwardly at an angle from the inner face of the nut, it contacts first with a work piece as the nut is threaded on a bolt and as pressure is applied thereto by the continued movement of the nut, it assumes a position coplanar with the remainder of the inner or lower face of the nut and in so doing lockingly engages the nut in position on the bolt against accidental or unintentional displacement or loosening.

In so lockingly engaging the bolt and its threads the nut moves slightly in a plane at substantially right angles to the axis of the nut and of the bolt and by reason of this movement and of the movement of the spring section in assuming a position coplanar with the remainder of the inner or lower face of the nut, the threads of the bolts are gripped or cramped by the threads of the nut, all without damage to the threads of either the bolt or the nut and without distorting, warping, bending or cocking the bolt. When the nut is removed from its operative position the spring section returns to its normal or initial position and the nut and its bolt may be repeatedly used.

The method by which the individual features and characteristics peculiar to the present nut are attained contemplates the formation of the nut blank, the tapping thereof so that the nut may have the required movement relative to the bolt in becoming locked in place, the creation of the slot in the blank, and the production of a nut possessed of the essential resiliency, hardness and other inherent characteristics.

It may at this point be noted that the slot in the nut is formed in two lengths, a relatively narrow inner length having parallel sides and an inner extremity at right angles to said sides and a relatively wider outer length also having parallel sides and separated from the corresponding or continuing sides of the inner length by shoulders, the shoulder on one side of the slot aligning transversely of the slot with shoulder on the opposite side of the slot. The form of this slot, as will be manifest, assists in the functioning of the nut and the production thereof is a direct result of the method herein described, it being also manifest that this slot may have several sections of varying widths each creating a pair of opposed shoulders.

Reference being had more particularly to the drawing 10 designates the body of a nut, of any suitable shape and size and provided with the outer or upper face 11, the inner or lower face 12 and the usual multiple side faces 13. The inner or lower face 12 of the nut is formed in two portions, viz., a portion 14 which lies parallel to the outer or upper face 11 and a portion 15 extending outwardly at an angle from the inner extremity of the portion 14. This angularly inclined portion 15 of the inner or lower face 11 of the nut 10 extends at least to and preferably beyond the central axis of the nut and thus has, by preference, a greater length than the portion 14 of the face.

A central bore 16 is provided in the nut 10 and is interiorly tapped to produce threads of the desired character. Certain well known standards have heretobefore been adopted or recognized in the production of nuts particularly as to the tapping thereof in relation to the size of the nut. In order to allow for the accumulation or formation of any scale within the threads of the bore 16 and especially to permit a movement of the nut transversely of the axis of the cooperating bolt in assuming its locking position the present invention contemplates tapping the bore 16 oversize or big as compared to the standard tapping thereof to a given standard size. In other words any particular standard nut has its bore tapped or threaded to a specified standard whereas the bore 16 of the present nut 10 is tapped oversize or somewhat larger than the standard for this particular nut so that prior to assuming its locked position on the cooperating bolt there is a noticeable play between the bolt and nut, which is completely taken up as the nut lockingly engages the bolt.

Within the body of the nut is a slot 17 positioned directly above the angularly disposed portion 15 of the inner or lower face 12 and extending at an angle upwardly or outwardly from one of the side faces 13 toward the outer or upper face 11 to terminate beyond the axis of the bore 16 of the nut. This slot 17 creates a spring section 18 integral with the body of the nut 10 on each side of the bore 16 and bounded on one side by the slot and on the other by the angularly disposed portion 15 of the inner or lower face 12. As the nut is threaded on a bolt the outer extremity of this spring section 18 contacts first with the work piece and as this operation continues the pressure of the nut against the work piece causes the spring section 18 to move inwardly, reducing the slot 17 until the angularly disposed portion 15 of the inner or lower face 12 rests coplanar with the portion 14 thereof. When the spring section 18 has assumed a position with its outer face 15 coplanar with the remainder 14 of the inner or lower face 12 the nut 10 has been shifted slightly transversely of the cooperating bolt. In this manner the threads of the bolt are cramped or grippingly engaged by the threads of both the body of the nut and of its spring section 18 so that the nut is locked in place against accidental displacement.

Upon the removal of the nut 10 from the bolt and the contact of its inner face with the work piece the spring section 18, by reason of the resiliency of the metal of the nut, returns to its original position. The nut may be repeatedly used without damage of any kind to the nut or to the coacting bolt.

Each side of the slot 17 is provided with a shoulder 20 medially of its length, the shoulder 20 on one side being aligned transversely of the slot with the shoulder 20 on the opposite side thereof. These shoulders 20 are created by forming the slot in two lengths or sections, the narrower inner section 21 and the wider outer section 22, which sections adjoin or abut at said shoulders 20. The side walls of the slot 17 and of both sections 21 and 22 thereof are parallel one to the other and the shoulders 20 are at right angles to said sides, as is also the inner extremity 23 of the slot.

If desired the slot 17 may be provided with a plurality of pairs of opposed shoulders 20, by forming said slot in a plurality of sections each narrower than the preceding section as the inner extremity of said slot is approached.

The present method of making the aforesaid nut, in addition to the several steps resulting in the physical features thereof, contemplates the production of said nut from a metal that is strong, tough and easily treated and manipulated and yet possessed of sufficient resiliency and hardness in the finished nut for the latter to function and operate as described.

A flat bar of metal alloy, preferably steel having a carbon content of from 0.4% to 0.75% is employed to form the nut blank. The metal alloy used in the bar may of course vary and where steel is used it is possible for the carbon content thereof to vary above or below the aforesaid limits. The flat bar thus employed is hot forged to form the nut blanks, each having the desired external shape and the peculiar characteristics of construction hereinbefore described and the central bore 16.

In this hot forging each nut blank at least one corner 24 of the blank formed by two adjoining side faces 13 and at the outer extremity of the angularly disposed portion 15 of the inner or lower face 12 of the blank is chamfered or beveled to create a plane surface 25 to lie at right angles to the plane of the cutter during the slotting operation and therefor at right angles to the finished slot. While it is preferable to so chamfer or bevel the corner 24 of the blank during the hot forging thereof to form the plane surface 25 it is possible to create this plane surface 25 in any other manner after the blank has been otherwise completed. This plane surface 25 may be repeated at each corner 24 of the nut blank if desired but it is only necessary for it to be at the corner 24 first contacting the cutting element during the slotting of the blank.

After the blank is completely formed as aforesaid the central bore 16 thereof is tapped oversize or base, i. e., the bore is tapped oversize with respect to the usual tapping thereof for the adopted or recognized standard. This oversize tapping of the bore 16 serves the double purpose of providing some play between the nut and its coacting bolt whereby the nut in assuming its locked position on the bolt moves slightly transversely of the axis of the bolt and also to eliminate the necessity of treating the finished nut to remove any scale or other foreign matter which may form or accumulate in its threads.

The blank thus formed and tapped is then slotted. This is accomplished by placing the nut 10 at an angle to the vertical so that the slot 17 immediately after the slotting operation will lie in a vertical plane and so feeding the nut to a cutting wheel or tool that its edge will first contact the nut on the plane surface 25 lying at right angles to the plane of the cutter. Without the plane surface 25 the cutter or tool would initially contact a part of the nut sloping upwardly and downwardly on each side thereof, with the result that the edge portion of the cutter or tool would tend to move laterally with respect to its normal plane of operation, thereby scarring the blank, inaccurately placing the slot and not infrequently breaking, warping or otherwise damaging the cutter or tool. Of course the nut blank may be fed to a cutter operating in a vertical or in a horizontal plane or in a plane at an angle to either, but in each instance the outer and inner faces 11—12 of the blank, due to the angular disposition of the slot therein, are angularly disposed to the plane of the cutter and the plane surface 25 of the blank contacting the cutter first lies at right angles to the plane thereof.

The slotting of the nut may be accomplished by any suitable type of tool or cutter: preferably by a rotary abrasive disc. This operation is carried out in two steps: first the cutting or forming of the wider outer section 22 of the slot 17 terminating at the shoulders 20; and second the cutting or forming of the narrower inner section 21 of the slot beginning at the shoulders 20 and terminating at the right angularly disposed inner extremity 23 of the slot. The inner narrower section 21 of the slot is centrally disposed with respect to the width of the wider outer section 22 and therefore may be formed by a cutter operating centrally in said wider outer section 22. The slot 17 including its sections 21—22 is cut by successive cutters, the second thinner than the first, but occupying the same position relatively to the blank being slotted. If more than one pair of opposed shoulders 20 is to be provided in the slot 17 and consequently more than two sections 21—22 formed therein, these sections are successively formed or cut by slotting tools successively of reduced thickness.

Upon the completion of the foregoing steps of the method the nut is hardened to a degree to develope the resilience required to return the spring section 18 thereof to its initial or normal position when the pressure on the inner face of the nut 10 is removed by threading it on the bolt in a direction away from a work piece. Where the nut 10 is made of steel of the character hereinbefore described this hardening is accomplished by heating, quenching and drawing the nut to the required hardness and this preferably, though not necessarily, is to a point within the range of 300 to 400 on the Brinell scale of hardness. While the hardening of the nut has been described as the last step in the method, it is to be done before the slotting, so that the nut for all intents and purposes is entirely finished and complete before it is slotted as herein set forth. In practicing this invention it is preferable to complete and harden the nut prior to the slotting thereof but it is to be understood that the hardening may be done last without departing from the spirit and scope thereof.

What is claimed is:

1. The method of making a spring nut consisting in hot forging a bar of strong, tough, free milling steel having a carbon content of from 0.4% to 0.75% to the desired shape creating a blank having a bore and a portion of its inner face extending outwardly at an angle to the remainder of said face and a plane surface at a corner of the blank angularly disposed to the face of the blank, tapping the bore of the blank oversize in comparison to recognized standard, slotting the blank between its outer face and the angular disposed portion of its inner face, said plane surface being held at right angles to the plane of the resulting slot during said operation, and hardening the nut by heating, quenching and drawing to degree within the range of 300 to 400 of the Brinell hardness test.

2. The method of making a slotted spring lock nut consisting in hot forging a bar of strong, tough free milling steel having a carbon content of from 0.4% to 0.75% to create a blank having a bore, multiple side faces, an inner face and an outer face with a portion of the inner face extending outwardly at an angle to the remainder thereof, creating a plane surface at a corner formed by a pair of adjoining side faces adjacent to the outer extremity of the angularly disposed portion of the inner face, said plane surface lying angularly to the faces of the blank, tapping the bore of the blank oversize in comparison to a recognized standard, positioning the blank with said plane surface extending on both sides of the planes of a pair of rotary cutters and at right angles thereto, successively subjecting the blank to said cutters the second cutter operating to a greater depth in the nut than the first, and hardening the blank by heating, quenching and drawing to a degree within the range of 300 to 400 of the Brinell hardness test.

3. The method of making a slotted spring lock nut consisting in hot forging a bar of strong, tough, free milling steel having a carbon content of from 0.4% to 0.75% to create a blank having a bore, multiple side faces, an outer face and an inner face, a portion of the latter extending outwardly at an angle to the remainder thereof, providing a plane surface on the blank at a corner between adjoining side faces thereof adjacent the extremity of the angularly disposed portion of the inner face lying at an angle to the faces of the blank, tapping the bore of the blank oversize in comparison to a recognized standard, positioning the blank with said plane surface extending on both sides of the operating plane of a pair of rotary cutters and at right angles thereto, the first of said cutters being thicker than the second, subjecting said blank successively to said cutters whereby the second of said cutters will operate to a greater depth than the former, and hardening the nut by heating, quenching and drawing to a degree of within the range of 300 to 400 of the Brinell hardness test.

4. The method of making a slotted spring lock nut consisting in hot forging a bar of strong, tough, free milling steel, having a carbon content of from 0.4% to 0.75%, to create a blank having a bore, multiple side faces, an outer face and inner face, a portion of the latter extending outwardly at an angle to the remainder thereof, forming a plane surface, angularly disposed to the blank, tapping the bore oversize in comparison to a recognized standard, successively subjecting the blank to cutters of decreasing thickness while said plane surface transects the plane of said cutter at right angles, and hardening the nut by heating, quenching and drawing to a degree within the range of 300 to 400 of the Brinell hardness test.

5. The method of making a slotted spring lock nut consisting in hot forging a bar of strong, tough, free milling steel, having a carbon content of from 0.4% to 0.75%, to create a blank having a bore, multiple side faces, an outer face and inner face, a portion of the latter extending outwardly at an angle to the remainder thereof, forming a plane surface, angularly disposed to the faces of the blank, at a corner between two adjoining side faces and adjacent the extremity of the angularly disposed portion of the inner face, tapping the bore oversize in comparison to a recognized standard, positioning the blank with said plane surface at right angles to and transecting the operating plane of a cutter, subjecting the blank so positioned successively to a series of cutters each cutting to a greater depth and imparting a narrower cut than its predecessor, and hardening the nut by heating, quenching and drawing to a degree within the range of 300 to 400 of the Brinell hardness test.

6. The method of making a lock nut consisting in hot forging a strong, tough, free milling metal into a blank of standard shape, providing a cutting surface on said blank in a plane at an angle to each of the faces of the blank, tapping the blank oversize in comparison to a recognized standard, subjecting the blank to a cutting tool operating at right angles to the cutting surface aforesaid, and hardening the nut by heating, quenching and drawing.

7. The method of making a lock nut consisting of hot forging metal stock into a blank of the desired shape, creating a cutting surface on the blank lying in a plane angularly disposed to the faces of the blank, tapping the blank oversize in comparison to a recognized standard, subjecting the blank successively to a series of cutting tools with said cutting surface lying at right angles to the plane of said tools, and hardening the nut so made by heating, quenching and drawing.

8. The method of making a lock nut consisting of hot forging metal stock into a blank of the desired shape, creating a cutting surface on the blank angularly disposed to the faces thereof, tapping the blank oversize in comparison to a recognized standard, hardening the nut by heating, quenching and drawing and subjecting the blank successively to a series of cutters operating at right angles to the cutting surface of the blank, each of said cutters making a deeper and narrower cut in the blank than its predecessor.

9. The method of making a lock nut consisting in hot forging metal stock into a blank of the desired shape, creating a cutting surface thereon angularly disposed to the faces of the blank, tapping the nut oversize in comparison to a recognized standard, subjecting the blank to a series of cutters operating in a plane at right angles to said cutting surface, each cutter making a deeper and narrower cut in the blank than its predecessor in the same relative position in the blank, and hardening the nut by heating, quenching and drawing.

10. The method of making a lock nut consisting in forging metal stock into a blank of the desired shape, forming a flat cutting surface on the blank at an angle to the faces thereof, oversize tapping the blank, hardening the nut, and forming a slot therein by subjecting the cutting surface to a series of cutters successively of decreasing thickness and increasing diameter.

11. The method of making a lock nut consisting in forming tough, free milling metal stock into a blank of the desired shape, creating a flat cutting surface thereon, tapping the blank, angularly slotting the blank by successively subjecting the flat cutting surface thereof to a series of rotary cutters, each of less thickness and greater diameter than its predecessor, and hardening the nut.

12. The method of making a lock nut consisting in forming tough, free milling metal stock into a blank of desired shape, tapping the blank, hardening the blank, and subjecting the blank successively to a series of rotary cutters, each operating in the same relative position on the nut and each being thinner and making a deeper cut than its predecessor.

13. The method of making a lock nut consisting in forming metal stock into a blank of desired shape, tapping said blank oversize in comparison to a recognized standard, hardening the nut to develope resiliency therein and slotting the blank at an angle to the inner face thereof.

14. The method of making a lock nut consisting in forming metal stock into a blank of desired shape, tapping said blank oversize in comparison to a given standard, hardening the nut to develope sufficient resilience for a spring section to return to its normal angular position when free to do so and slotting the blank at an angle to its inner and outer faces to create a spring section.

15. The method of making a lock nut consisting in forming metal stock into a blank of desired shape, tapping said blank, hardening the nut, and slotting the blank angularly to its inner and outer faces by subjecting it to a successive series of cutters operating in a common plane on the nut, each cutter making a narrower and deeper cut than its predecessor.

16. The method of making a lock nut consisting in forming metal stock into a blank of desired shape, tapping said blank, hardening the blank, and slotting the blank angularly to its inner and outer faces by subjecting it to a successive series of cutters operating in a common plane on the nut, each cutter making a deeper cut in the nut blank than its predecessor.

17. The method of making a lock nut consisting in forming metal stock into a blank having a portion of its inner face extending outwardly at an angle to the remainder thereof and a central bore, tapping said bore oversize in comparison to a recognized standard, positioning said blank at an angle and subjecting it to a cutter thereby angularly slotting it to end in alignment longitudinally of the axis of the blank with the origin of said angularly disposed portion of the inner face.

18. The method of making a lock nut consisting in forming metal stock into a blank having a central bore and a portion of its inner face extending outwardly at an angle to the remainder thereof, tapping said bore, positioning said blank at an angle, and subjecting it successively to a series of rotary cutters progressively angularly slotting the blank at the same point.

19. The method of making a lock nut consisting in forming metal stock into a blank having a central bore and a portion of its inner face extending outwardly at an angle to the remainder thereof, tapping said bore, positioning said blank at an angle, and subjecting to a series of cutters all operating on the blank at the same point and each progressively angularly slotting the blank to a greater depth and more narrowly than its predecessor.

WILLIAM A. BERGSTROM.